(12) United States Patent
Schietinger

(10) Patent No.: US 9,620,031 B2
(45) Date of Patent: Apr. 11, 2017

(54) TRAINING AND SIMULATION DEVICE FOR ELECTRIC FUNCTIONAL PROCESS IN ELECTRIC, ELECTROMECHANICAL AND ELECTROFLUIDIC SYSTEMS

(75) Inventor: Mathias Schietinger, Nurtingen (DE)

(73) Assignee: FESTO AG & CO. KG, Esslingen (DE)

( * ) Notice: Subject to any disclaimer, the term of this patent is extended or adjusted under 35 U.S.C. 154(b) by 737 days.

(21) Appl. No.: 12/812,578

(22) PCT Filed: Oct. 7, 2009

(86) PCT No.: PCT/EP2009/007181
§ 371 (c)(1),
(2), (4) Date: Jul. 12, 2010

(87) PCT Pub. No.: WO2010/040507
PCT Pub. Date: Apr. 15, 2010

(65) Prior Publication Data
US 2010/0297595 A1   Nov. 25, 2010

(30) Foreign Application Priority Data

Oct. 11, 2008  (DE) .......................... 10 2008 051 401

(51) Int. Cl.
G09B 23/18    (2006.01)
G05B 19/05    (2006.01)
G09B 25/02    (2006.01)

(52) U.S. Cl.
CPC ......... G09B 23/183 (2013.01); G09B 25/025 (2013.01)

(58) Field of Classification Search
CPC ................................ G09B 23/18; G05B 19/05
(Continued)

(56) References Cited

U.S. PATENT DOCUMENTS 3,728,534 A * 4/1973 Bertram et al. ................. 326/47
3,869,811 A * 3/1975 Valentine ............. G09B 23/183
434/314

(Continued)

FOREIGN PATENT DOCUMENTS

DE   3431076    3/1986
DE   4407987    9/1994
(Continued)

Primary Examiner — Jack Yip
Assistant Examiner — Alvin Carlos
(74) Attorney, Agent, or Firm — Hoffmann & Baron, LLP

(57) ABSTRACT

Proposed is a training and simulation device for electric functional processes in electric, electromechanical and electrofluidic systems, with a controller (14) for the simulation and visual reproduction of system components (25-31) on a display (11), and with electric terminals (13) located adjacent to the display (11) for cable connection to hardware components of the system, wherein optical inputs and/or outputs of the simulated system components on the display (11) are assigned to at least a part of the terminals (13) and wherein the controller (14) comprises means for generating electric voltages at the terminals (13) of assigned outputs of the simulated system components (31) and/or for generating reactions of the simulated system components (25-30) in dependence on voltages externally applied to terminals (13) assigned to inputs of said simulated system components.

10 Claims, 4 Drawing Sheets

(58) Field of Classification Search
USPC .......................................................... 434/301
See application file for complete search history.

(56) References Cited

U.S. PATENT DOCUMENTS

| | | | | |
|---|---|---|---|---|
| 3,881,260 A * | 5/1975 | Hombs | .......................... | 434/118 |
| 3,975,836 A * | 8/1976 | Broder | .......................... | 434/118 |
| 4,006,538 A * | 2/1977 | Valentine | ............. | G09B 23/182 |
| | | | | 434/314 |
| 4,026,040 A * | 5/1977 | Valentine | ............. | G09B 23/182 |
| | | | | 434/314 |
| 4,259,077 A * | 3/1981 | Keweza | ............... | G09B 23/186 |
| | | | | 434/118 |
| 4,613,952 A * | 9/1986 | McClanahan | ................... | 703/6 |
| 4,656,580 A * | 4/1987 | Hitchcock et al. | ............. | 703/19 |
| 4,695,968 A * | 9/1987 | Sullivan et al. | ................ | 703/13 |
| 4,697,241 A * | 9/1987 | Lavi | ................. | 703/15 |
| 4,769,596 A * | 9/1988 | Faucett | .............. | G01R 31/2805 |
| | | | | 324/537 |
| 4,776,798 A * | 10/1988 | Crawford | ....................... | 434/224 |
| 4,870,561 A * | 9/1989 | Love et al. | ....................... | 700/87 |
| 4,943,238 A * | 7/1990 | Gregorio | ....................... | 434/224 |
| 4,970,664 A * | 11/1990 | Kaiser et al. | ................. | 715/804 |
| 5,220,512 A * | 6/1993 | Watkins et al. | ................ | 716/102 |
| 5,437,044 A * | 7/1995 | Hohner et al. | ................. | 710/72 |
| 5,479,355 A * | 12/1995 | Hyduke | ........................... | 703/14 |
| 5,485,599 A * | 1/1996 | Milne et al. | ....................... | 703/6 |
| 5,562,454 A * | 10/1996 | Kanzaki et al. | .............. | 434/219 |
| 5,625,580 A * | 4/1997 | Read et al. | ..................... | 703/21 |
| 5,629,857 A * | 5/1997 | Brennan | ........................ | 716/139 |
| 5,667,387 A * | 9/1997 | Klemm | ......................... | 434/224 |
| 5,673,198 A * | 9/1997 | Lawman et al. | .............. | 716/102 |
| 5,784,275 A * | 7/1998 | Sojoodi et al. | ................. | 700/86 |
| 5,847,955 A * | 12/1998 | Mitchell et al. | ................. | 700/86 |
| 5,905,649 A * | 5/1999 | Sojoodi et al. | ................. | 700/83 |
| 6,009,256 A * | 12/1999 | Tseng et al. | ..................... | 703/13 |
| 6,148,275 A * | 11/2000 | Papamarcos et al. | ........... | 703/13 |
| 6,182,020 B1 * | 1/2001 | Fairbanks | ..................... | 702/117 |
| 6,606,731 B1 * | 8/2003 | Baum et al. | ................... | 716/103 |
| 6,925,429 B2 * | 8/2005 | Iimori | ............................ | 703/14 |
| 7,468,602 B2 * | 12/2008 | Sleeman | ............. | G01R 15/125 |
| | | | | 324/115 |
| 7,941,299 B1 * | 5/2011 | Aldrich et al. | ................... | 703/1 |
| 8,301,423 B1 * | 10/2012 | Aldrich et al. | ................... | 703/2 |
| 2007/0044078 A1 * | 2/2007 | Cifra | ............................. | 717/135 |
| 2007/0069716 A1 * | 3/2007 | Sleeman | ............. | G01R 15/125 |
| | | | | 324/99 D |

FOREIGN PATENT DOCUMENTS

| | | |
|---|---|---|
| DE | 29605847 | 6/1996 |
| DE | 19543826 | 5/1997 |
| DE | 19703090 | 10/1997 |
| DE | 19650328 A1 | 6/1998 |
| DE | 202006001553 | 8/2006 |
| EP | 0283382 | 9/1988 |
| EP | 1770455 | 4/2007 |
| WO | WO0153841 | 7/2001 |

* cited by examiner

TRAINING AND SIMULATION DEVICE FOR ELECTRIC FUNCTIONAL PROCESS IN ELECTRIC, ELECTROMECHANICAL AND ELECTROFLUIDIC SYSTEMS

This application claims priority based on an International Application filed under the Patent Cooperation Treaty, PCT/EP2009/007181, filed Oct. 7, 2009, which claims priority to DE 102008051401.2, filed Oct. 11, 2008.

BACKGROUND OF THE INVENTION

The invention relates to a training and simulation device for electric functional processes in electric, electromechanical and electrofluidic systems, comprising a display on which system components including their operation can be shown and/or simulated. Such a simulation or display of system components or systems in their movements and/or their operational sequence is known. Although such movements and operational sequences can be shown in dependence on parameter processes, connections or links of simulated system components to real hardware components and/or hardware systems are unsuited to visual representation.

SUMMARY OF THE INVENTION

The present invention is based on the problem of creating a training and simulation device of this type which can be combined with real hardware components and/or hardware systems in a simple and clear way in the manner of an interconnection.

According to the invention, this problem is solved by a training and simulation device with the features of claim 1.

The device according to the invention in particular offers the advantage that it features real electric terminals for interconnecting the training and simulation device with real hardware components or systems as if the device itself were at least one hardware component. By means of the optical assignment of these terminals to inputs and/or outputs of the simulated system components, electric connections are simulated as if the displayed system components were interconnected with the hardware components as real components. This permits a fast and variable construction of systems, for example for learning or training purposes. The simulated components can be modified, replaced or updated quickly. Real voltages applied to the terminals act on assigned inputs of the simulated system components as if applied to corresponding hardware components, i.e. the simulated system components react accordingly, for example by moving. Similar voltages are applied to terminals assigned to outputs of simulated system components. If the simulated component is a position sensor, for example, a position signal corresponding to the position of a simulated moving object is generated at the respective terminal.

The measures listed in the dependent claims allow for advantageous further developments of and improvements to the training and simulation device specified in claim 1.

To assign terminals to inputs and/or outputs of simulated system components, corresponding lines are advantageously provided between terminals and display, which the display shows to lead to the respective inputs and/or outputs. In this way, the terminals can be clearly assigned to inputs and/or outputs of the simulated components.

A panel or a panel-shaped housing advantageously forms a device assembly comprising at least the display, the terminals and the controller. Such a compact assembly can easily be located in the region of a real hardware system and connected thereto via the terminals.

For operation, in particular for selecting or generating system components on the display, controls are expediently provided on the device assembly or adjacent to the display and/or the display is designed as a touch screen.

For communication with an external computer or central processing device, the device assembly is expediently provided with I/O terminals and/or wireless connection means, for example radio and/or internet modules or devices. Any I/O terminals may be designed as bus terminals.

In the controller or its memory, any system component to be simulated and reproduced can be stored, and by communicating with a computer device, the stored system components can be altered or further system components can be added. In addition or as an alternative, function modules of stored system components or combinations thereof capable of installation into the device assembly may be provided, such modules being quickly and easily interchangeable.

A holder is advantageously provided for accommodating at least one device assembly. This means that several device assemblies can be accommodated and connected to one another by means of the terminals. In this way, the simulated system components are functionally joined to one another.

Owing to the facility for storing system components in the controller or by means of function modules, the training and simulation device can be used to great advantage and very variably for very different electric operational sequences. The operation of at least one of the following system components can be simulated and reproduced on the display: switches, relays, measuring instruments, actuators, sensors, electric and/or fluidic circuits, electronic function modules, control panels, motors, drives, voltage sources and generators, conveying apparatus, indicators, light sources, logic circuits and links, action programmes and flow charts.

An embodiment of the invention is shown in the drawing and explained in greater detail in the description below. Of the drawing:

DETAILED DESCRIPTION OF THE PREFERRED EMBODIMENTS

Figure 1:
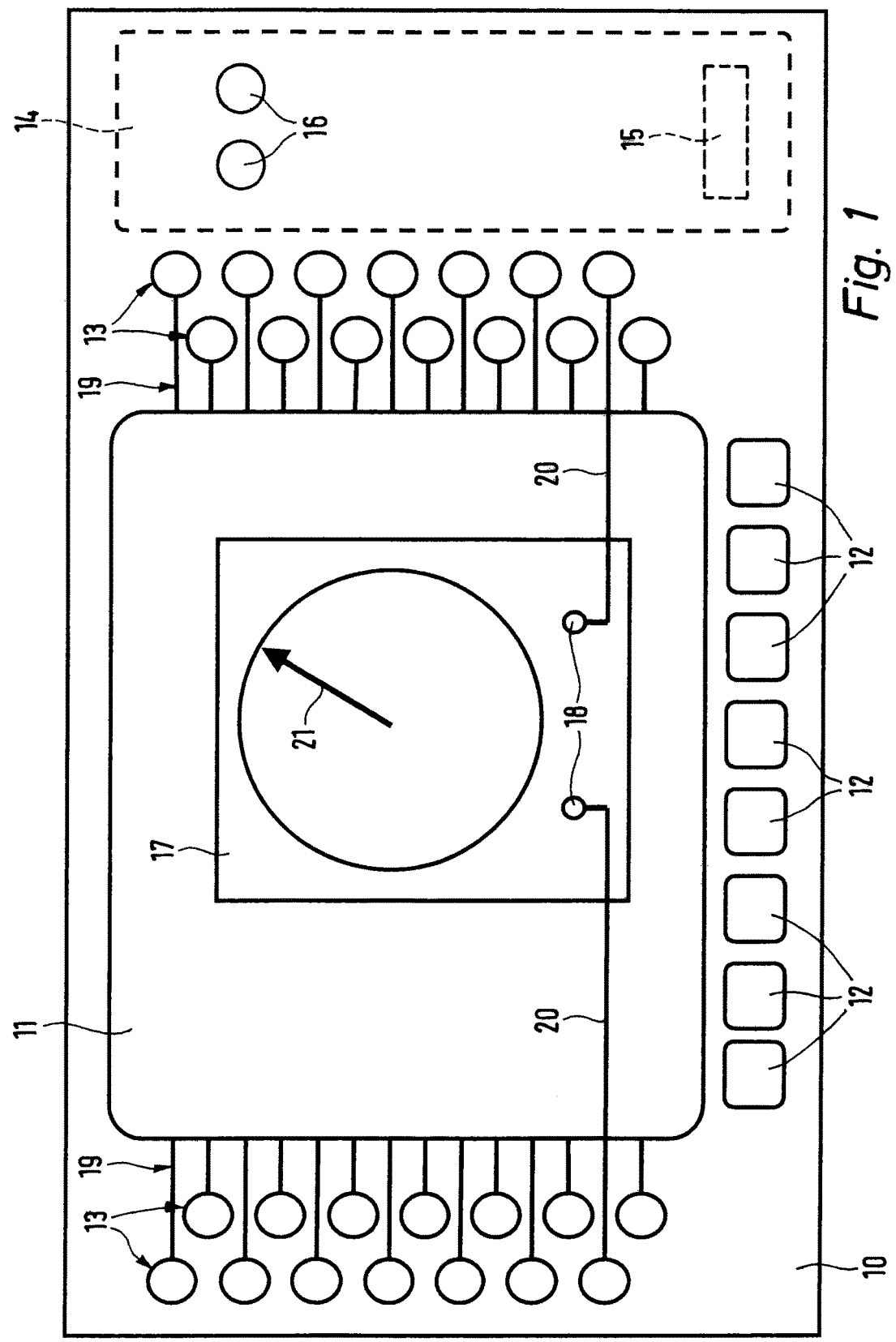
FIG. 1 shows an embodiment of a training and simulation device according to the invention, with a measuring instrument simulated and reproduced on the display.

The embodiment of the training and simulation device shown in FIG. 1 has a rectangular flat housing 10 with a display 11 designed as a screen. A plurality of pushbuttons 12 is provided below the display 11. Fourteen electric terminals 13 are disposed on each side of the display, their number obviously being variable. A controller 14 for the simulation and visual representation of system components on the display 11 is located on or in the flat housing 10. This controller 14 may be a programmable micro-controller or another programmable logic controller. An ASIC version can also be used.

The pushbuttons 12 are used to select the system components to be visually reproduced on the display 11 and also permit programming and re-programming operations. As an alternative or in addition, the display may be designed as a touch screen, permitting the direct input of control commands and other inputs via the touch screen. In individual cases, the pushbuttons may be surplus to requirements.

In place of a controller 14 permanently fitted to or installed into the housing, the controller 14 may be designed as variably installable and interchangeable function modules. These function modules may be fixed-programmed for defined stored system components or combinations thereof, or they may be programmable. It is also possible to provide interchangeable function modules in addition to the permanently installed controller.

The controller 14 includes a wireless communication module 15, which may be either integrated or designed as a separate module. It is used for wireless communication with a remote external computer or central processing device. Communication is for example based on radio, Internet, Bluetooth, WLAN or the like. Via this communication module, the controller 14 can be programmed or deprogrammed, or additional virtual system components can be entered.

The flat housing 10 is further provided with I/O terminals 16, which are likewise used for communication with the controller 14 via cable links. Such cable links may for example be designed as bus terminals. Simpler variants may not be provided with I/O terminals 16 or the communication module 15.

FIG. 1 shows a virtual measuring instruments 17 on the display 11. Its two inputs 18 are virtually connected to a terminal 13 on the left-hand side of the display 11 and to a terminal 13 on the right-hand side of the display 11, i.e. two terminals 13 are assigned to the two inputs 18. Lines 19 symbolising conductors run towards the display 13 to illustrate the assignment of the terminals 13. The lines 19 of the terminals 13 linked to the inputs 18 are continued as lines 20 running to the inputs 18 on the display. The controller 14 which generates, simulates and visually reproduces the lines 20 and the virtual measuring instrument 17 also generates the function assigned to the measuring instrument 17. As a result, voltages applied to the terminals 13 virtually linked to the measuring instrument 17 effect a deflection of the virtual needle 21 of the measuring instrument 17. In this configuration, the training and simulation device serves as a measuring instrument and can be used as such in combination with real hardware circuits and components. Others may be simulated using the pushbuttons 12 and/or the touch screen display 11, for example several different measuring instruments virtually connected to other terminals. In addition, measuring ranges and methods can be changed and varied as well, using the control means.

In addition to instruments measuring voltage and current, various other types of electric measuring instruments can obviously be simulated, such as oscilloscopes, frequency meters, digital and analogue instruments and the like.

Figure 2:
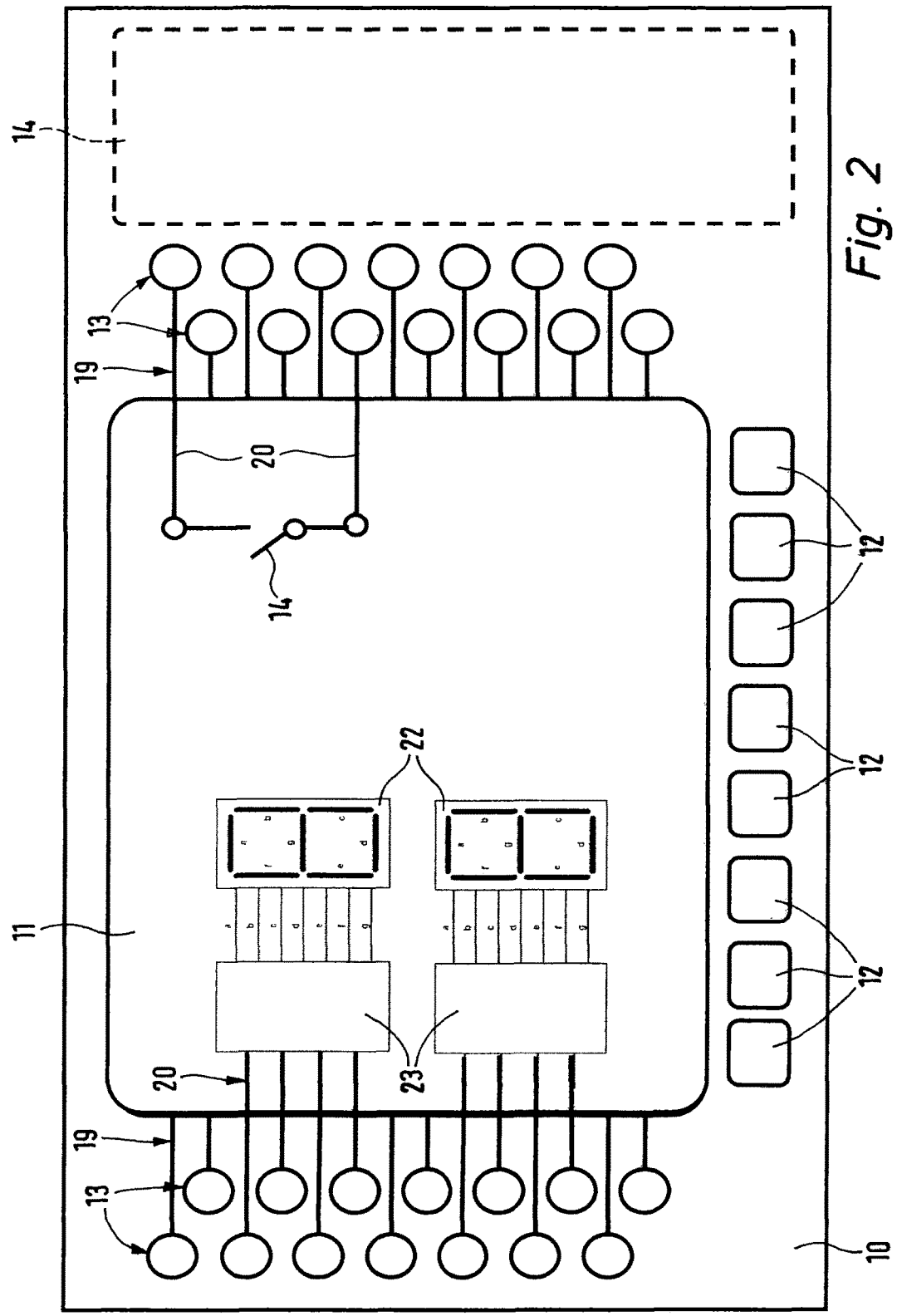
FIG. 2 shows the same training and simulation device, with two 7-segment indicating elements and a switch simulated on the screen.

FIG. 2 illustrates the same training and simulation device, and corresponding regions and components are identified by the same reference numbers. For clarity, the communication module 15 and the I/O terminals 16 have been omitted in FIG. 2.

According to FIG. 2, the controller 14 simulates on the display 11 two 7-segment indicating elements 22, each of which is virtually connected via virtual BCD decoders 23 to four terminals 13 on the left-hand side of the display 11. Also simulated and reproduced is an electric switch 24 virtually connected to two terminals 13 on the right-hand side of the display 11.

The 7-segment indicating elements 22 are used to reproduce desired values. These may be sensor signals, voltages, currents or other state variables. The corresponding signals are applied by a real hardware system not shown in the drawing to the terminals 13 via cables. The BCD decoders may either be programmed or selected from a plurality of stored decoders in the manner of a modular system.

The two terminals 13 which are virtually connected to the switch 24 can likewise be connected to a real hardware configuration via cables. This switch 24 can be operated by way of the pushbuttons 12 or directly via the display 11 designed as a touch screen. According to the drawing, the two terminals 13 virtually connected thereto are in this case genuinely connected to or isolated from each other. This is likewise simulated by the controller 14. If for example a measuring process is to be initiated by operating the switch 24 in the real hardware configuration connected to the training and simulation device via cables, the measuring result can be indicated on the 7-segment indicating elements 22 immediately.

Here, too, many variants of system component could be simulated on the display 11 by the controller 14. The number of indicating elements 22 may vary and/or other indicating elements could be simulated. In place of an electric switch, several switches or switch combinations could be used, for example relay switches, solenoid switches, electronic switches or the like.

Figure 3:
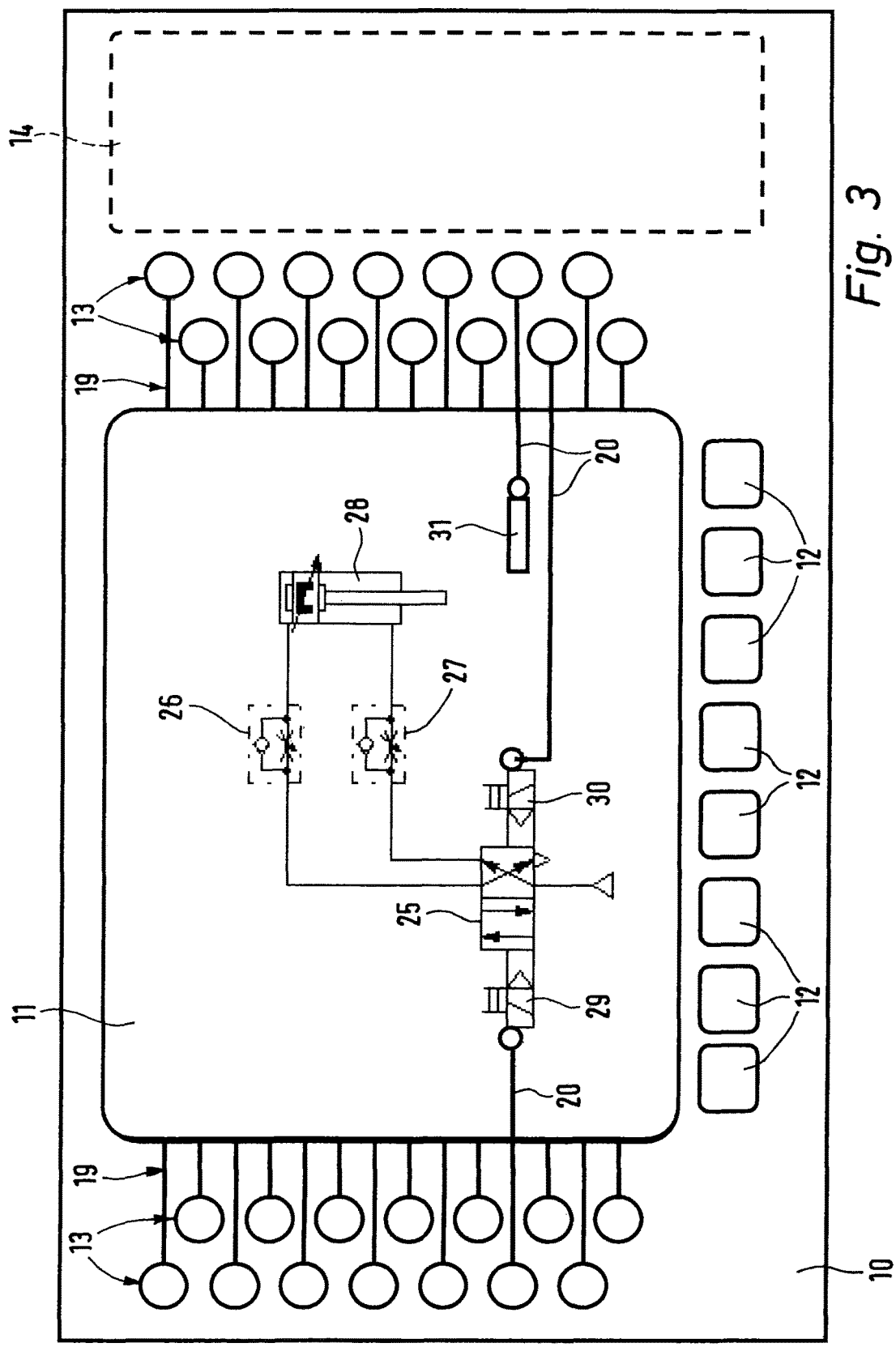
FIG. 3 shows the same training and simulation device, with a simulated fluidic circuit arrangement and a sensor.

FIG. 3 once again shows the same training and simulation device, the controller 14 in this case generating and reproducing on the display 11 an electro-fluidic circuit comprising a 4/2 solenoid valve 25 which controls an operating cylinder 28 with a cushioning arrangement via two return-orifice check valves 26, 27. The 4/2 solenoid valve 25 is a pulse valve with two solenoid coils 29, 30 controlling opposite switching positions, each being virtually connected to a terminal 13 on opposite sides of the display 11. In addition, a position sensor 31 is virtually connected to a terminal 13 on the right-hand side of the display 11.

The electro-fluidic circuit simulated in this way on the display 11 by the controller 14 can be electrically connected to a real hardware configuration, such as a fluidic system or control, via the assigned terminals 13, thus forming a system in which the virtual system components operate like real system components. This means that the solenoid valve 25 is reversed by applying switching signals to the respective terminals 13, effecting a movement in the operating cylinder 28. If the latter reaches the position sensor 31 in a defined position, a corresponding sensor signal is transmitted by the controller 14 at the terminal 13 virtually connected thereto.

The electro-fluidic circuit may of course be modified, for example by adding further components. By using the pushbuttons 12 or directly via the display 11 designed as a touch screen, aspects like the restriction characteristics of the return-orifice check valves 26, 27, the cushioning effect in the operating cylinder 28 or the switching times of the solenoid valve 25 can be changed for training or test purposes. In addition, further sensors can be generated, for example pressure and temperature sensors. The controller 14 may for example store a plurality of electro-fluidic circuits which can be retrieved and combined with one another, allowing for modifications and individual extensions.

Instead of the electro-fluidic system described by way of example, electric and electro-mechanical systems can be generated together with their respective functions, the assigned terminals 13 then automatically acting as input or output terminals.

By means of the controller, further system components and systems can be generated, which may comprise other actuators, electronic function modules, control panels, motors, drives, voltage sources and generators, conveying apparatus, indicators, light sources, logic circuits and links, action programmes and flow charts in any combination. Via the communication module 15 and/or the I/O terminals 16, further system components can be stored in the controller 14 or its memory in a simple way for variable selection and reproduction.

Figure 4:
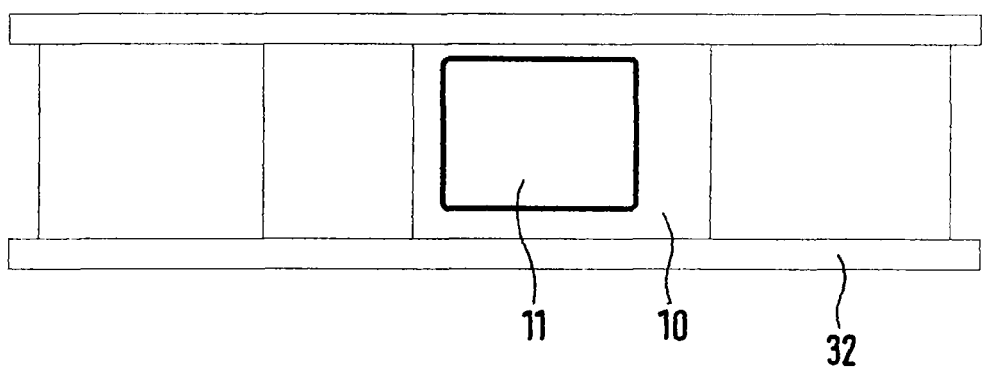
FIG. 4 shows a holding panel for one or more such devices.

FIG. 4 shows a holding panel 32 for a training and simulation device as illustrated or for several such devices. These may either just be placed on the holding panel 32 or attached thereto. Several training and simulation devices can be connected to one another via the terminals 13, resulting in the generation of more complex systems and circuits which may one again be interconnected with real hardware components or systems. In this way, complex electric, electro-mechanical or electro-fluidic systems can be generated by uncomplicated means for practice and training purposes in order to test their functions, to learn or to experience, for example by modifying individual system components or their characteristics, which can be achieved virtually in a simple way using the controls.

Such a training and simulation device may for example be constructed as a laptop, differing from a commercial laptop only by the additional terminals.

According to the above description, the flat housing 10 together with the display 11, the terminals 13 and the controller 14 as well as the pushbuttons 12, if provided, forms a device assembly. Instead of a flat housing, the components may alternatively be disposed on a panel or integrated into a larger device.

The invention claimed is:

1. A training and simulation system for electric functional processes in electric, electromechanical and electrofluidic systems, the training and simulation system comprising:
    a hardware component of an electric, electromechanical or electrofluidic system;
    a training and simulation device externally electrically connected to said hardware component, the training and simulation device comprising:
        a controller configured to generate a virtual display of a simulated hardware component based on said hardware component, said virtual display of said simulated hardware component including a virtual optical input terminal and a virtual optical output terminal;
        a housing;
        a variable electronic display screen supported by said housing for displaying said virtual display generated by said controller; and
        a plurality of electrical terminals located on said housing adjacent to said variable electronic display screen for external cable connection to said hardware component, wherein said virtual optical input terminal of said virtual display is virtually connected to at least a first of said plurality of electrical terminals located on said housing, and wherein said virtual optical output terminal of said virtual display is virtually connected to at least a second of said plurality of electrical terminals located on said housing, and wherein the controller comprises a program instruction that is operable to generate reactions of the virtual display depending on a voltage externally applied to said first and second electric terminals from said hardware component,
    wherein said housing comprises a flat panel surface adjacent to said variable electronic display screen and a plurality of lines symbolizing conductors provided on said flat panel surface, each of said lines running between an electrical terminal and an edge of said variable electronic display screen in order to virtually connect said electrical terminals to said virtual optical input and output terminals of said virtual display, and
    wherein the controller is configured to generate virtual lines of said virtual display, said virtual lines connecting said virtual optical input and output terminals to said lines provided on said flat panel surface.

2. The training and simulation system according to claim 1, wherein said housing comprises a flat panel with the display screen and the electrical terminals being arranged on said flat panel and the controller being contained within said housing.

3. The training and simulation system according to claim 1, wherein push-button controls are provided on said housing adjacent said display screen for selecting, generating or modifying system components to be virtually visually reproduced on the display screen.

4. The training and simulation system according to claim 1 further comprising I/O terminals and/or wireless connecting means for communication with an external computer.

5. The training and simulation system according to claim 1, wherein the controller comprises a function module with stored system components or combinations thereof, which can be installed into the housing and which are interchangeable.

6. The training and simulation system according to claim 1, wherein a holder is provided for the accommodation of the housing.

7. The training and simulation system according to claim 1, wherein operation of at least one of the following system components can be simulated and reproduced on the display: switches, relays, measuring instruments, actuators, electric and/or fluidic circuits, electronic function modules, control panels, motors, drives, voltage sources and generators, conveying apparatus, indicators, light sources, logic circuits and links, action programs and flow charts.

8. The training and simulation system according to claim 1, wherein controls are provided for selecting, generating or modifying system components, and/or, wherein the display is designed as a touch screen.

9. The training and simulation system according to claim 1, wherein the controller comprises a function module with stored system components or combinations thereof, which can be installed into the housing and which are interchangeable.

10. The training and simulation system according to claim 1, wherein said variable electronic display screen comprises a touch screen for permitting the direct input of control commands and other inputs via the touch screen.

* * * * *